United States Patent

Whitehead et al.

[11] Patent Number: 5,113,386
[45] Date of Patent: May 12, 1992

[54] FOCUS AND TRACKING ERROR DETECTOR APPARATUS FOR OPTICAL AND MAGNETO-OPTICAL INFORMATION STORAGE SYSTEMS

[75] Inventors: Frank R. Whitehead, Orangevale; Alan B. Marchant, San Jose, both of Calif.

[73] Assignee: Eastman Kodak Company, Rochester, N.Y.

[21] Appl. No.: 428,806

[22] Filed: Oct. 30, 1989

[51] Int. Cl.$^5$ .............................. G11B 13/04
[52] U.S. Cl. .................. 369/44.41; 369/44.42; 369/44.23; 369/44.11; 369/44.24; 250/201.5
[58] Field of Search .............. 369/44.32, 44.33, 44.38, 369/44.39, 44.41, 44.12, 44.11, 44.27, 109, 44.24, 44.23, 44.42, 112, 110; 250/201.5

[56] References Cited

U.S. PATENT DOCUMENTS

| | | | |
|---|---|---|---|
| 4,747,090 | 5/1988 | Yamashita et al. | 369/45 |
| 4,841,509 | 6/1989 | Kamisada et al. | 369/45 |
| 4,969,142 | 11/1990 | Nagashima et al. | 369/109 |
| 4,989,189 | 1/1991 | Sander et al. | 369/44.11 |

OTHER PUBLICATIONS

I. Prikryl, "Optical Servo Crosstalk" paper for a talk given at a topical meeting of the Optical Society of America entitled Optical Data Storage held at Los Angeles, Calif. in Jan. 1989.

Primary Examiner—Roy N. Envall, Jr.
Assistant Examiner—Hung Dang
Attorney, Agent, or Firm—William W. Holloway

[57] ABSTRACT

Focus and tracking error optical servo detector apparatus is shown employing a single four element detector array. Focus error detection based on spot size sensing is described in which focus error offset caused by beam transition between track and non-track areas is substantially reduced by shaping the detector element areas so as to derive servo signals from substantially only the overlap lobes between the zeroth order diffraction beam and the plus and minus first order diffraction beams in the optical readout beam from the recording element. The readout beam incident on the detector is anamorphically shaped to retain high focus error signal gain while reducing sensitivity in the tracking direction to movement of the beam caused by factors such as thermally induced beam misalignment, vibration and the like. The detector is optionally provided with a polarizer sheet positioned in front of the detector with its transmission axis parallel with the polarization of the beam incident on the recording element for the purpose of blocking birefringence effects on the readout beam from adversely affecting the detector performance.

6 Claims, 2 Drawing Sheets

FOCUS AND TRACKING ERROR DETECTOR APPARATUS FOR OPTICAL AND MAGNETO-OPTICAL INFORMATION STORAGE SYSTEMS

FIELD OF THE INVENTION

This invention relates to optical and magneto-optical information storage systems and, more particularly, to detector apparatus for deriving focus error and tracking error signals from the readout optical beam from the storage medium.

BACKGROUND OF THE INVENTION

In optical and magneto-optical recording systems, information is recorded as marks created in information storage tracks formed on a recording element which can be read out by means of a focused optical beam. The recording element conventionally takes the form of a circular disk with concentric or spiral data tracks, although other forms of recording elements are possible. For this discussion, the recording element will be assumed to be in conventional disk format.

In the case of optical recording, the information can be stored on the media in the data tracks in the form of minute surface features, such as pits, which produce intensity variations in the optical readout beam which can be detected and decoded by suitable sensor electronics. In the case of magneto-optical recording, the information is stored as reversed magnetic domains in a magnetic layer along the data tracks which cause changes in polarization of the readout beam. These polarization changes are sensed by photo detectors preceded by suitably aligned polarizers. In this discussion, the term "optical", in relation to the storage medium, will be used interchangeably herein to refer to both purely optical and magneto-optical information storage systems.

It is well known in the operation of optical information storage systems that it is necessary to maintain the scanning optical beam in sharp focus on the recording element and also to precisely control the beam's lateral position to assure that a desired data track is being followed. To meet these requirements, conventional optical recording systems incorporate independent servo sensor systems to produce focus and tracking error signals based on the detection of certain characteristics of the readout beam. Typically, the readout beam returned from the disk contains diffraction order beams scattered by the grooved profile of the data tracks on the disk. It is known to use differential detection of the overlap regions between the plus and minus first order diffraction beams with the zeroth order beam in the readout beam to derive the tracking error signal.

A variety of detection techniques are also known for deriving the focus error signal, examples of which are knife edge detection, astigmatic beam detection, and spot-size detection. Of the various known techniques, it can be shown that spot-size detection has the advantage of generating the least amount of crosstalk between the tracking error signal and the focus error signal. Conventional spot-size detection is illustrated in FIG. 1 wherein a circular readout beam 10 is focused near a planar detector array 16 which is comprised of six detection elements A-F. Each of the detector elements are coupled through separate preamplifiers to sum and difference amplifiers (not shown) to derive the appropriate focus and tracking error signals. The signal $(A+C+D+F)-(B+E)$ is an indication of spot-size and is therefore a good focus error signal since the beam spot size grows or shrinks as the disk moves ahead and behind the focal point of the incident optical beam.

Beam 10 includes a circular-shaped zeroth order beam 13 and plus and minus first order diffraction beams 14 and 15 which form overlap lobes 16 and 17 with the zeroth order beam 13. The push-pull tracking error signal is derived from the signal $(A+B+C)-(D+E+F)$. Because the beam displacement directions for tracking and focus are orthogonal, there is little crosstalk between these signals. However, for this detection arrangement, six separate preamplifiers are required. Also, an undesired offset in the focus error signal is caused when the beam moves from areas of tracks and non-track or mirrored areas on the disk, where the diffraction order beams disappear. A further difficulty with the spot-size detector of FIG. 1 arises from the fact that the gain of the focus error signal is relatively low. Although the gain of the focus error signal can be improved by moving the detector near the beam focus where the spot is smaller, this has the disadvantage of making the tracking signal very sensitive to very small beam movements caused by physical changes in the disk drive such as misalignment resulting from thermal changes, vibration etc..

U.S. Pat. No. 4,841,509, by Kamisada et al., issued Dec. 3, 1986, shows a modified spot-size focus detection arrangement which reduces the effect on tracking offset which occurs with these small beam movements. In this patent, a pair of four element spot-size detectors are positioned in separate paths of the readout beam on opposite sides of the beam focal point. In each path the beam is converted from a circular to an elliptical shape with the major axis of the beams aligned with the central elements of each detector for detection of the tracking error signals. As the disclosure indicates, the expansion of the beam in the tracking error direction on the detector elements reduces the sensitivity of the tracking error signal to the movement of the beam caused by physical changes in the disk drive system. The Kamisada disclosure, however, requires two separate detectors with the focus error signal being derived from the outside detector elements, thus requiring as many as eight preamplifiers with consequent additional cost and complexities in the design of the servo detection system.

It is, therefore, an object of the present invention to provide an improved focus and tracking error detection apparatus based on spot-size focus detection that utilizes a single detector array to achieve the desired focus and tracking error signals.

It is a further object of the invention to provide a focus and tracking error detection apparatus utilizing a single detector array that minimizes focus offset caused by transition of the optical beam between track and non-track areas on the disk.

SUMMARY OF THE INVENTION

Thus in accordance with the invention, there is provided focus and tracking error detector apparatus for an optical information storage system which comprises means for scanning a focused optical beam on information storage tracks of an optical recording element to produce a readout beam comprised of a zeroth order beam and plus and minus first order diffracted beams, and means for shaping the readout beam into an elongated beam having a major axis aligned with the first order diffracted beams in the direction of cross-track diffraction on the recording element and a minor axis orthogonal thereto. The detector apparatus is further provided with photosensitive detector means positioned in the far field of the readout beam and centered on the central axis of the readout beam, the detector means being comprised of two elongated side detectors, the elongated dimensions of which are parallel with the major axis of the readout beam. The two side detectors are separated in the direction of the minor axis of the readout beam by two elongated central detectors, the elongated center lines of which are aligned with the major axis of the readout beam. In accordance with a feature of the invention, the side and central detector elements comprise a single detector array in the servo detection apparatus and preferably lie in a common plane orthogonal to the readout beam propagation direction. First electronic circuit means are coupled to the detectors for deriving a focus error signal equal to the sum of the two side detector outputs minus the sum of the two central detector outputs, and second electronic circuit means are coupled to the central detectors for deriving a tracking error signal equal to the difference between the two central detector outputs.

In the readout beam incident on the detector apparatus of the invention, the zeroth order and the plus and minus first order diffracted beams conventionally form overlap lobes in the readout beam separated by a region of primarily just the zeroth order beam. In a particularly preferred form of the invention, at least the side detectors and, depending on the degree of separation between the first order diffracted beams, possibly also the central detectors are rendered insensitive to a substantial portion of the primarily zeroth order region of the readout beam such that the derived focus and tracking error signals are determined principally by the overlap lobes of the beam, thereby to minimize any generation of an offset component in the focus error signal caused by transition of the optical beam from transition between track and non-track areas on the disk.

Because of the potential for distortion of the readout beam, particularly the first order diffracted beams, by birefringence effects created by the substrate of the recording element, a polarizer sheet may be placed in the path of the readout beam in front of the detector means with its transmission axis parallel to the polarization axis of the incident beam on the recording element. This polarizer sheet blocks the birefringence effects and further enhances the performance of the detector apparatus.

DETAILED DESCRIPTION

Figure 1:
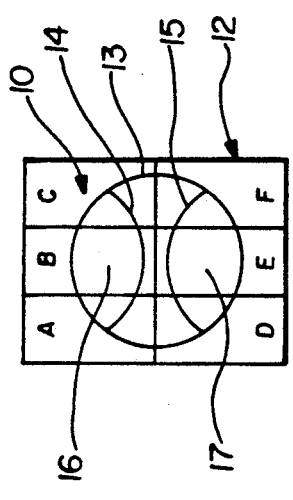
FIG. 1 is a diagrammatic representation of a prior art spot size servo detector array.
Figure 2:
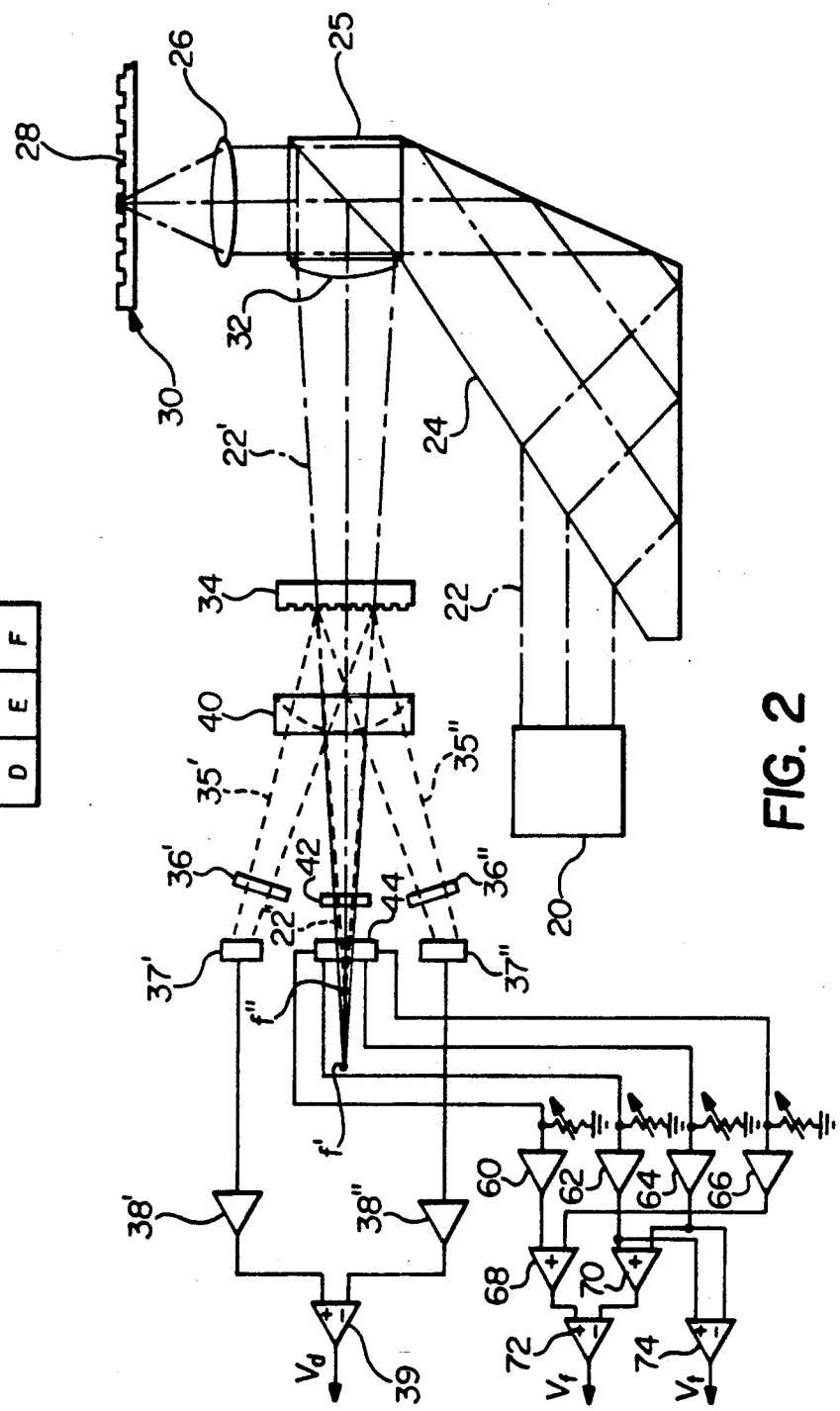
FIG. 2 is a schematic illustrations of a magneto-optical disk drive read head embodying the present invention.

Referring now to FIG. 2, the illustrated principal components of a read head for a magneto-optical disk drive include a coherent light source 20, which may be a semiconductor laser and collimating lens system, for generating an ellipitcally shaped beam 22 of parallel light rays. The beam is anamorphically expanded, circularized and deflected 90 degrees by prism 24 to a partially polarizing beam splitter 25. The portion of the beam passing directly through the beam splitter is brought to a sharp focus by objective lens 26 onto information recording tracks 28 of an optical storage disk 30. Upon being reflected and refracted by the disk 30, the returning readout beam 22 is now comprised of a zeroth order undiffracted beam and plus and minus first order diffracted beams which are of significance for servo detection purposes. As is known in magneto-optic playback, the incident beam 22 is plane-polarized and the polarization of the returning readout beam is rotated slightly by magnetized domains in the data tracks either in a positive or negative direction depending on the magnetization polarity of the domains. The polarization of the returning beam may also be distorted by substrate birefringence.

The reflected beam is re-collimated by objective lens 26 and deflected 90 degrees by beam splitter 25. Upon exiting the beam splitter, the readout beam 22' is refocused by spherical lens 32 to a focal point f'. A diffraction grating 34 is positioned in the path of focused beam 22' to produce plus and minus diffraction order beams 35' and 35" which separately pass through plane polarizing filters 36' and 36" to photodetectors 37' and 37', respectively. As is known, the outputs of photodetectors 37',37" are coupled via preamplifiers 38' and 38" to opposite inputs of a differential amplifier 39 to produce data signals, $V_d$, from the detected polarity shifts corresponding to polarization rotation of the readout beam 22'.

To generate focus and tracking error signals from the central readout beam 22" a cylindrical lens 40 is positioned in the path of the beam with the cylindrical axis of the lens oriented in parallel with the direction of cross-track diffraction of the incident beam on the disk. Cylindrical lens 40 operates to astigmatize beam 22', anamorphically focusing the beam along an azimuth perpendicular to the plane of the drawing at a nearer focal point f', as indicated by dotted lines 22". The effect of this is to reshape beam 22' into an elongated or elliptical beam shape with its major axis lying in the plane of the drawing in parallel with the direction of cross-track diffraction on the disk and perpendicular to the plane of the drawing parallel to the disk tracks.

Figure 3:
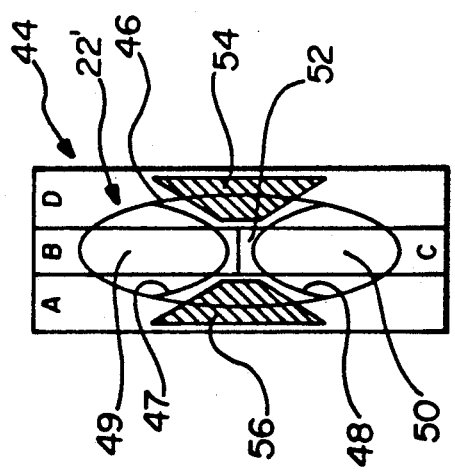
FIG. 3 is a diagrammatic representation of one preferred embodiment of a four element spot size servo detector array according to the invention.

A single planar servo detector array 44 is positioned in the path of the reshaped readout beam 22' for use in detecting the focus and tracking error signals, $V_f$ and $V_t$, respectively. As seen in FIG. 3, detector array 44 is comprised of four planar detector elements A-D with two elongated side elements A and D separated by two elongated central elements B and C. Detector array 44 is oriented with all elements A-D lying in a common plane orthogonal to the propagation direction of beam 22' and with the elongated dimensions of the elements parallel to the major axis of the elliptical beam 22'. With the optical system in proper alignment, detector array 44 is centered on the beam central axis and the elongated center lines of the central elements B and C are aligned with the elliptical beam's major axis. Preferably, the detector array is positioned in the far field of the focused beam 22' to achieve a spot size that is suitable for detection purposes. A polarization analyzer 42 which transmits the polarization corresponding to the polarization of the beam incident on the disk is preferably included in the path of readout beam 22' ahead of detector array 44 and may take the form of a plane-polarized filter mounted as a window on the face of detector array 44 with the axis of transmission of the filter parallel with the major axis of beam 22'. The purpose of polarization analyzer 42 is to eliminate disk birefringence components in beam 22' which adversely affect the symmetry of the beam and introduce an imbalance in the output signals. Since the distorted birefringence components are normally polarized at right angles to the major axis of the beam through the diffraction beams, they are blocked by the analyzer with its axis parallel to the beam 22' major axis. For clarity of illustration the filter is not shown in FIG. 3.

First electronic circuit means for deriving a focus error signal equal to the sum of the two side detector outputs minus the sum of the two central detector outputs includes adjustable gain preamplifiers 60 and 66 coupling detector elements A and D to summing amplifier 68, respectively, and adjustable gain preamplifiers 62 and 64 coupling central detector elements B and C, respectively, to summing amplifier 70. The outputs of summing amplifiers 68 and 70 are in turn coupled to positive and negative inputs of differential amplifier wherein which produces at its output the focus error signal $V_f$ equal to $(A+D)-(B+C)$. Second electronic circuit means for deriving a tracking error signal equal to the difference between the outputs of the central detector elements includes preamplifiers 62 and 64 coupled from detector elements C and D, respectively, to positive and negative input sides of differential amplifier 74 to produce at its output the tracking error signal $V_t$ equal to $(C-D)$. The use of adjustable gain preamplifiers allows the circuits to be used to compensate for any inherent electrical unbalance that may exist in the detector elements themselves.

Although not shown in the circuitry disclosed, it is known to include additional circuits to normalize the tracking error and focus error output signals by dividing each output by the total signal output from the respective detectors. Thus, the focus error output signal would be:

$$V_f = \frac{B - C}{B + C}$$

and the tracking error output signal would be:

$$V_t = \frac{(A + D) - (B + C)}{A + B + C + D}$$

and it will be understood that such post sensor processing does depart from the invention as described herein.

As seen in FIG. 3, beam 22' incident on the face of detector array 44 is comprised of an elliptical zeroth order beam 46 and plus and minus first order diffraction beams 47 and 48 overlapping the zeroth order beam to form slightly spaced apart overlap lobes 49 and 50, respectively, aligned with the major axis of the elliptical beam 22'. As a consequence of the curvilinear outlines of the diffraction order beam components, the central region 52 of beam 22' is comprised primarily of just the zeroth order beam 46, most of which is incident on the side elements A and D. The central elements B and C are exposed principally to the overlap lobes 49 and 50. Since the focus error signal $V_f$ is determined by the sum of the side detector outputs minus the sum of the central detector outputs, the in-focus condition is indicated when the contribution to the net output is equally balanced between the two pairs of detector elements. Since, many cases, the overlap lobes can have a different, oftentimes lower, intensity than the zeroth order region 52, it can be seen that the overlap lobes can make a proportionately different contribution to the output of the central detector elements B and C than to the side detector elements A and D. Consequently, when the scanning beam transitions from a grooved data track to a non-track area, such as a mirrored area between successive sectors of a track, the first order diffraction beams disappear, and the differential output between the central and side detector elements becomes unbalanced, thus falsely indicating an out-of-focus condition. The reverse occurs when the beam transitions from a non-track to a track area.

In accordance with a feature of the invention, this focus offset is minimized by making the side detector elements insensitive to at least a substantial portion of the zeroth order region 52 of the beam such that the differential output $V_t$ is determined substantially only by the overlap lobes 49 and 50. In the detector array 44 of FIG. 3, this is accomplished by positioning truncated pyramidal-shaped masks 54 and 56 over the central portions of side detectors A and D which are normally exposed only to the primarily zeroth order beam region 52. With such an arrangement, the disappearance or reappearance of the first order diffraction beams has a net zero effect on the output of the differential amplifier 72 and focus offset is thereby substantially eliminated as a problem when using a single detector array for servo detection. With the single detector array so configured, the benefits of balanced focus error signal detection are achieved that previously required separate detector arrays on opposite sides of the beam focal point. In practice, a small amount of the region of primarily zeroth order beam is retained to allow some small movement of the beam on the detector without causing tracking offset crosstalk into the focus error signal to occur. Such small movements can result from misalignment of the beam caused by such factors as thermally stress, vibration and the like.

Figure 4:
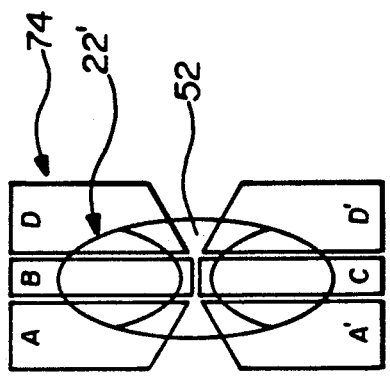
FIG. 4 is a diagrammatic representation of another preferred embodiment of a spot size servo detector array according to the invention.

In FIG. 4, an alternative form of detector array 74 is shown in which the side detector elements are each separated into two discrete elements A,A' and D,D' respectively. Each of the elements is shaped in a truncated manner so as to create triangular-shaped open areas under the primarily zeroth order region 52 of incident beam 22' that are not responsive to the beam. Elements A and A' are electrically interconnected (not shown) to create a single side detector element as are also elements D and D' thus creating, electrically, a four element detector array from the six elements shown.

Although not shown, the angular sides of the masks 54,56 in FIG. 3 or of the cutout portions of the side detectors in FIG. 4 could be made curvilinear to better conform the insensitive areas of the side detectors to the shape of the overlap lobes.

In the detector embodiments shown in FIGS. 3 and 4, the first order diffracted beam forming overlap lobes 49 and 50 are spaced fairly close together. The actual spacing is a function of groove geometry on the disk and, in some cases, the spacing may be substantially wider. In such cases, the benefits of the invention are realized by making portions of the central detector elements insensitive to the non-overlap zeroth order region of the beam incident on the detector, either by masking or truncating appropriate portions of the detector elements B and C.

The invention has been described in detail with particular reference to a presently preferred embodiment, but it will be understood that variations and modifications can be effected within the spirit and scope of the invention.

What is claimed is:

1. Focus and tracking error detector apparatus for an optical information storage system comprising:

means for scanning a focused optical beam on information tracks of an optical recording element to produce a readout beam comprised of a zeroth order beam and plus and minus first order cross-track diffracted beams;

means for shaping the readout beam into an elongated beam having a major axis aligned with the first order diffracted beams in the direction of cross-track diffraction on the recording element and a minor axis orthogonal thereto;

photosensitive detector means positioned in the far field of the readout beam and centered on the central axis of the readout beam, said detector means comprised of two elongated side detector elements, the elongated dimensions of which are parallel with the major axis of the readout beam, said side detector elements being separated in the direction of the minor axis of the readout beam by two elongated central detector elements, the elongated center lines of which are aligned with the major axis of the readout beam, said detector elements all lying in a common plane orthogonal to the propagation direction of the readout beam;

first electronic circuit means coupled to said detectors for deriving a focus error signal equal to the sum of the outputs of the two side detector elements minus the sum of the outputs of the two central detector elements;

and second electronic circuit means coupled to said central detector elements for deriving a tracking error signal equal to the difference between the outputs of the two central detector elements.

2. The detector apparatus of claim 1 in which the zeroth order and the plus and minus first order diffraction beams form overlap lobes in the readout beam separated by a region of primarily the zeroth order beam and in which said detector elements are rendered insensitive to a substantial portion of the primarily zeroth order region of the readout beam such that said derived focus and tracking error signals are determined principally by the overlap lobes of the beam to minimize the generation of an offset component in the focus error signal caused by transition of the scanning beam between track and non-track areas on the disk.

3. The detector apparatus of claim 2 in which each side detector includes a mask blocking exposure of the detector elements to a substantial portion of the primarily zeroth order region of the readout beam.

4. The detector apparatus of claim 2 in which said detector elements are so shaped as to receive the overlap lobes of the readout beam and to exclude a substantial portion of the primarily zeroth order region of the readout beam.

5. The detector apparatus of claims 2, 3 or 4 in which each side detector remains exposed to a relatively small portion of the primarily zeroth order region of the readout beam to accommodate slight movement of the beam in the direction of the elongated dimensions of the detectors caused by minute changes in mechanical properties of the disk drive system without introducing an undesired offset component in the focus error signal.

6. The detector apparatus of claim 1 in which the focused beam incident on the recording element is polarized with a predetermined axis of polarization and in which the detector apparatus further includes polarizer means positioned in the path of the readout beam in front of the detector means with an axis of transmission parallel with the polarization axis of the focused beam, thereby to render the detector insensitive to birefringence effects introduced in the readout beam by the recording element.

* * * * *

UNITED STATES PATENT AND TRADEMARK OFFICE
CERTIFICATE OF CORRECTION

PATENT NO. : 5,113,386
DATED : May 12, 1992
INVENTOR(S) : F. R. Whitehead and A. B. Marchant It is certified that error appears in the above-identified patent and that said Letters Patent is hereby corrected as shown below:

Col. 4, Line 29 delete "37'" and insert --37"--

Col. 4, Line 44 delete "f'" and insert --f"--

Col. 5, Line 66 delete "$V_f$is" and insert --$V_f$ is--

Signed and Sealed this

Seventeenth Day of August, 1993

Attest:

BRUCE LEHMAN

Attesting Officer        Commissioner of Patents and Trademarks